July 29, 1952          H. S. BRADLEY          2,605,096
WEIGH TABLE OR HOPPER FOR CUPOLA OR FURNACE CHARGING Filed Aug. 28, 1948          3 Sheets-Sheet 2

Inventor
Harry S. Bradley
By Christy, Parmelee Strickland
Attorneys

July 29, 1952  H. S. BRADLEY  2,605,096
WEIGH TABLE OR HOPPER FOR CUPOLA OR FURNACE CHARGING
Filed Aug. 28, 1948  3 Sheets-Sheet 3

Inventor
*Harry S. Bradley*
By *Christy, Parmelee, Strickland*
Attorneys

Patented July 29, 1952

2,605,096

UNITED STATES PATENT OFFICE 2,605,096

WEIGH TABLE OR HOPPER FOR CUPOLA OR FURNACE CHARGING

Harry S. Bradley, Pittsburgh, Pa., assignor to Shenango-Penn Mold Company, Pittsburgh, Pa., a corporation of Pennsylvania Application August 28, 1948, Serial No. 46,636

13 Claims. (Cl. 265—27)

This invention relates to apparatus for handling material and, in particular, to what is known in the art as a weighing table or hopper tiltably mounted on a scale, adapted to deliver to a skip measured amounts of the components making up a cupola or furnace charge.

The principal object of the invention is to provide a scale-mounted table or hopper for weighing successive portions of the charge components, adapted to dump them directly into a cupola or furnace-charging skip, which is much simpler, less expensive, and more convenient than present equipment for the purpose. A further object is to provide such table or hopper of this character with power means for tilting it to dump the contents thereof. A still further object is to provide a scale-mounted table or hopper having a small height above the floor level whereby it may be conveniently loaded by hand, using a barrow or shovel, as well as by a hoisting magnet or other loading device carried by an overhead crane. A still further object is to provide a spring mounting for the table adapted to absorb loading shocks and prevent them from being transmitted to the scale mechanism proper.

Briefly and generally stated, a preferred embodiment of my invention comprises a table or hopper open at one end and pivoted adjacent the open end for tilting about a transverse axis. The table or hopper rests on a sub-frame carried by a weighing scale of suitable capacity. The sub-frame is provided with spring cushions resiliently supporting said table or hopper. A fluid pressure cylinder and piston is suspended below the sub-frame and is pivotally connected to the table for lifting the free end thereof to cause tilting to the angle necessary for quick dumping. Air is preferably used for operating the cylinder and piston because it is made more easily available than hydraulic pressure, but any fluid pressure may be used.

The invention is especially designed for use with a cupola or furnace which is commonly charged with solid bodies of metal, such as pig iron and scrap, as well as with fuel and flux.

A complete understanding of the invention may be obtained from the following description and explanation which refer to the accompanying drawings illustrating a present preferred embodiment.

Referring now in detail to the drawings, the invention is there illustrated in connection with a cupola 10 having a charging skip 11. Such apparatus is well known and requires no detailed description. The skip is lowered into a pit 11a below the floor level F for loading.

Figure 2:
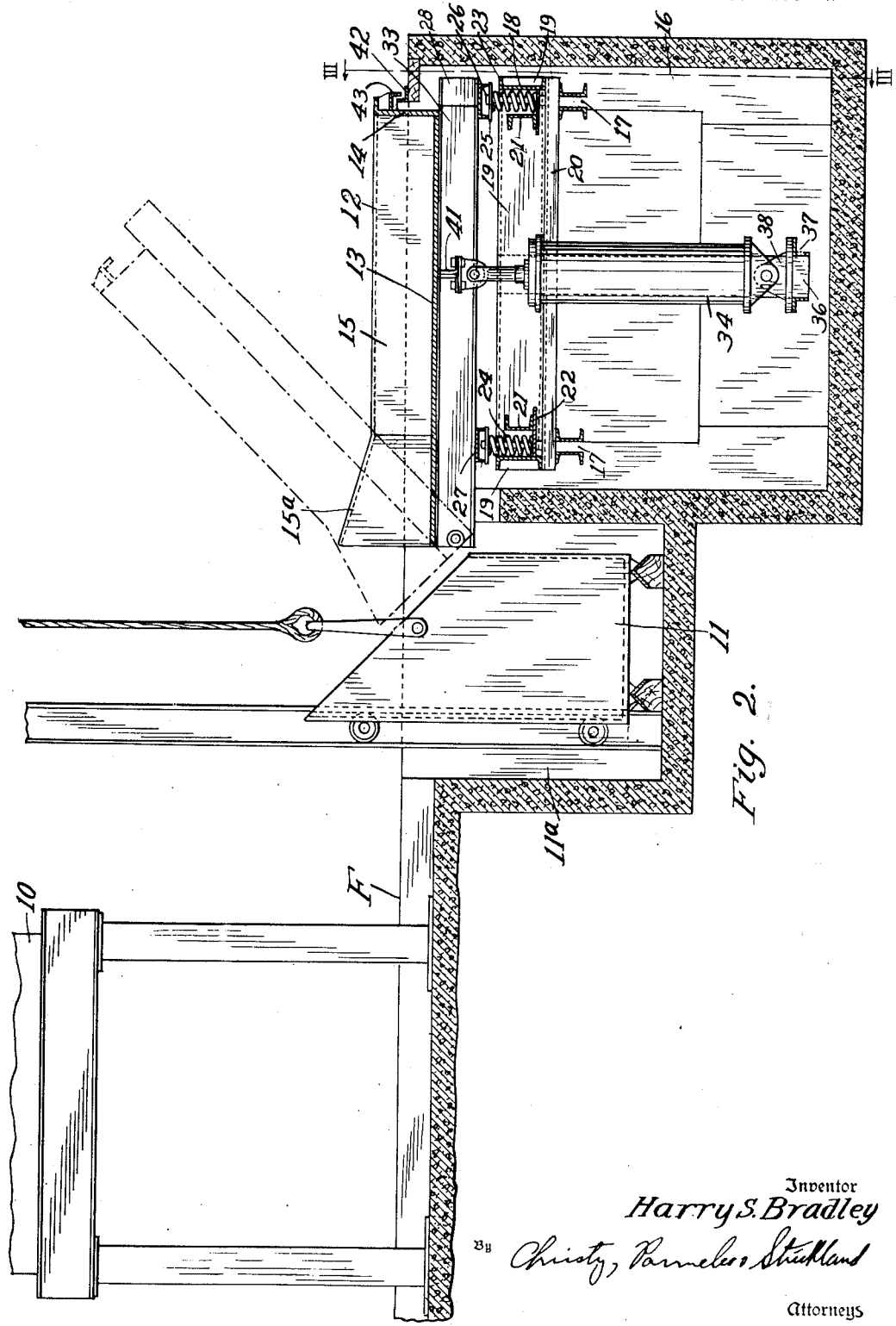
Fig. 2 is a vertical section taken along the plane of line II—II of Fig. 1 with parts in elevation.

My invention includes a scale-mounted table or hopper 12 adapted to receive a portion or all the cupola charge for weighing it and then to dump such charge into the skip by tilting to the position shown in chain lines in Fig. 2.

The pan 12 comprises a bottom 13, an end wall 14 and side walls 15, the other end being open. The side walls converge and slope upwardly toward the open end, as at 15a, forming a pouring spout. The table or hopper is disposed over a scale pit 16 adapted to accommodate a weighing scale of any suitable type (not shown). The load of the table and associated parts about to be described is applied to the scale by spaced beams 17 extending across the pit at opposite sides thereof and constituting a sub-platform of the scale. The table is carried on a sub-frame 18 mounted on this sub-platform.

The sub-frame 18 is composed of four lengths of channel 19 welded together to form a rectangle. This rectangle rests on the webs of a pair of spaced channels 20 disposed with their flanges down and extending between the beams 17. Interior channels 21 (see Fig. 2) extend between two opposite channels 19, parallel and adjacent to the other two, and bearing plates 22 are spaced therealong, welded thereto and to the channels 19. Spring cushions 23 rest on the bearing plates and are confined between the outer channels 19 and the inner channels 21. Each cushion comprises a compression spring 24, a top bearing plate 25, and a through bolt 26 having a nut thereon below the bottom bearing plate 22. The channels 20 have holes in their webs to permit descent of the bolts of the outer cushions. The bolts of the inner cushions are free to descend without obstruction.

Figure 1:
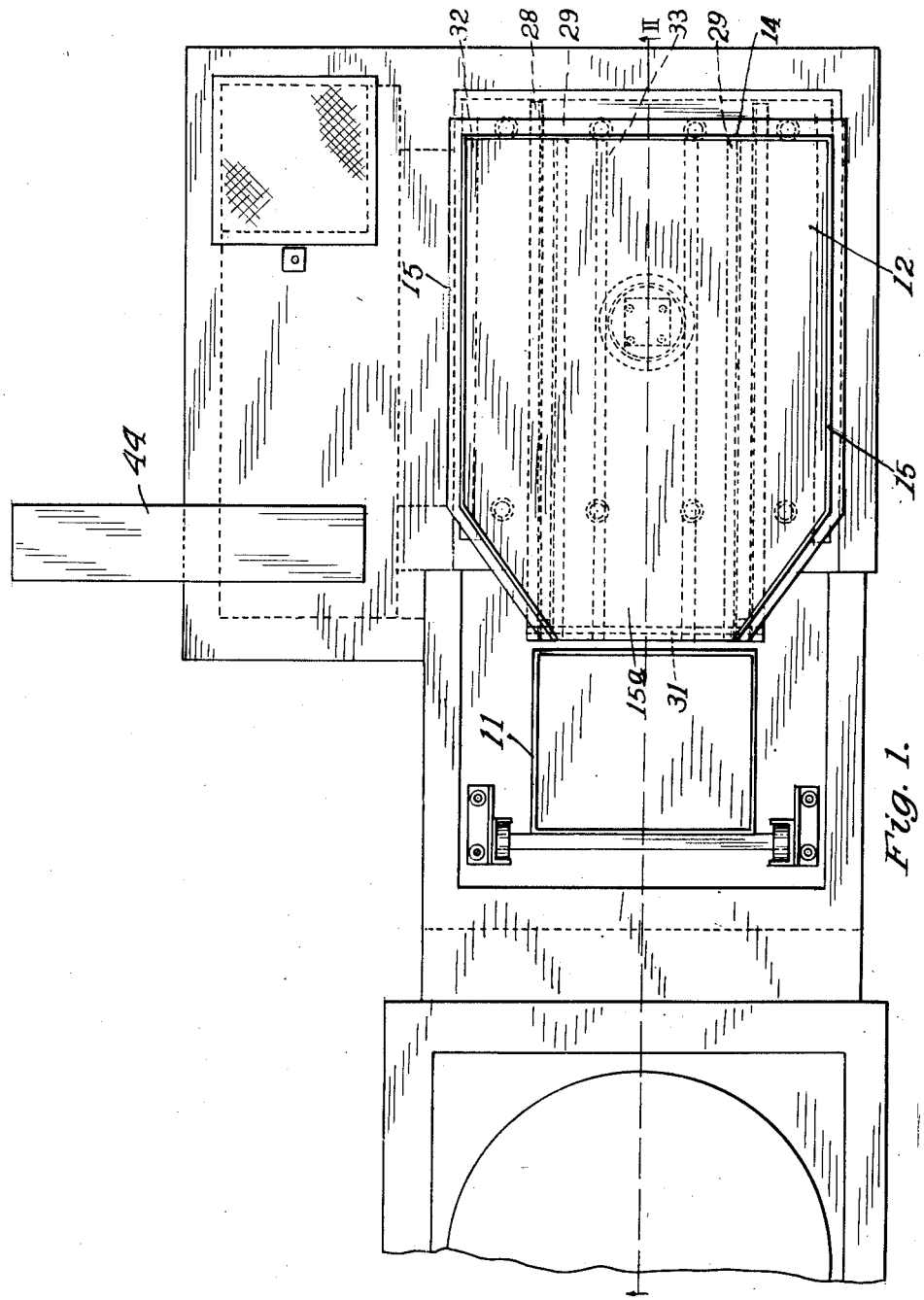
Fig. 1 is a plan view showing the relation of my improved weigh table or hopper to a charging skip and a cupola with which it is associated.

The sub-frame 18 carries an intermediate frame composed of channels 27 and 28. Channels 27 have their flanges disposed downwardly and welded to the top bearing plates 25 of the spring cushions. Channels 28 (see Fig. 3) extend transversely of the channels 27, are spaced inwardly of the ends thereof, and are welded thereto. They form the fixed members of the jack-knife hinges supporting the pan for tilting. The channels 28 extend outwardly over the spring cushions at the closed end of the table 12 as shown in Figs. 1 and 2. The movable members of the hinges are channels 29 welded to the bottom of the table. Both the channels 28 and 29 have alined holes and bearing hubs 30 at their ends adjacent the skip to accommodate a shaft 31. Additional channels 32 and 33 are welded to the bottom of the table adjacent the sides and the center line thereof, respectively. The channels 29, 32 and 33 constitute a bottom frame for the table 10.

An air cylinder and piston 34 for tilting the table 10, is carried in a yoke 35 depending from the channels 28. The yoke is composed of vertical channels 36 bolted to the channels 28 and horizontal angles 37 welded to channels 36. A pivot bearing 38 for the lower end of the cylinder 34 is seated on the angles 37. A similar bearing 39 for the outer end of the piston rod 40 is bolted to angles 41 extending between channels 33. The cylinder or motor means 34 is operated by fluid under pressure, supplied thereto from any convenient source through suitable connections (not shown) including a flexible hose to permit free movement of the cylinder so as to avoid any effect on the scale operation. As above indicated, air under pressure is the preferred fluid. A control valve of known type, of course, must be provided in the fluid supply line.

Lengths of angle bar 42 extend around the sides of the pit 16 other than that adjacent the skip 11 to prevent material being charged into the table from falling into the pit. The table also has lengths of angle bar 43 extending along the sides and closed end adapted to cooperate with the angles 42 when the table is horizontal, to exclude dirt and foreign objects, as well as rain and snow. This angle is of such height that it does not interfere with the normal movement of the scale. The scale indicator housing is diagrammatically indicated at 44.

Figure 3:
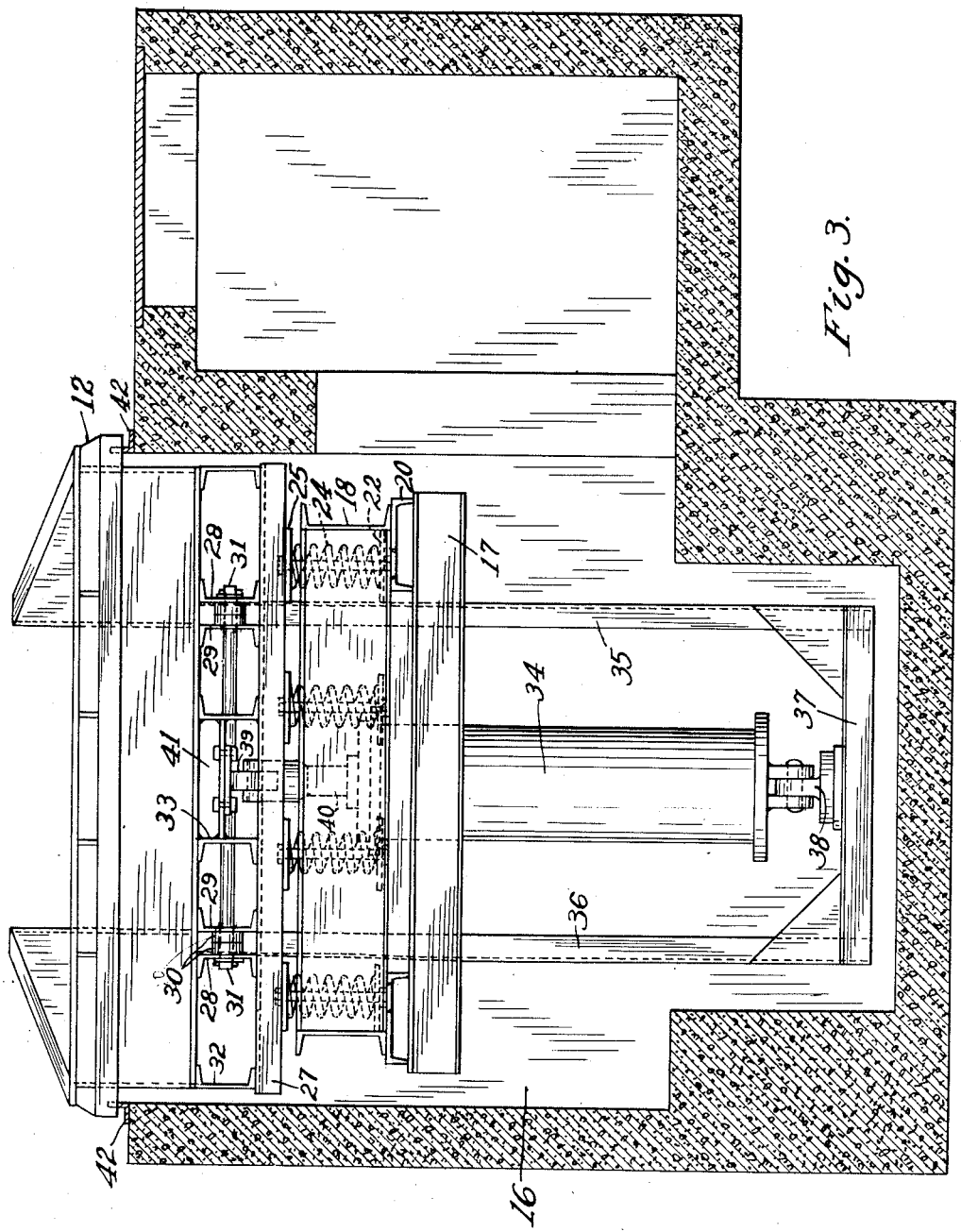
Fig. 3 is a transverse section taken along the plane of line III—III of Fig. 2.

The operation of the apparatus of my invention will be readily apparent from the foregoing. When the table is in its lowermost or horizontal position, it may be loaded with a portion of the cupola or furnace charge or with a complete charge in any convenient manner. It will be noted that the table is close to the level of the charging floor. Since the height of the sides of the table above the floor level is small as shown in Figs. 2 and 3, the material to be charged may be deposited by hand or by crane, depending on the nature and amount thereof, and even a wheelbarrow may be conveniently used. In either case, the spring cushions absorb the shocks incident to the deposit of successive increments and thereby protect the scale beam mechanism and other scale parts from injury.

When the desired amount of any given component of the charge has been placed in the table as shown by the indicating mechanism of the scale, the admission of compressed air or other fluid to the cylinder 34 causes the piston rod 40 to be extended, thus tilting the pan upwardly about the hinge shaft 31. The material therein is discharged rapidly by gravity into the skip when the table reaches the necessary angle. The pouring spout formed by the converging portions 15a of the side walls 15 confines the material as it is discharged and prevents spillage. When the table has been emptied, release of the air in the cylinder will permit the pan to return to horizontal position by gravity, whereupon it is immediately ready to receive another portion of the charge.

The invention is characterized by several advantages of importance, some of which have already been mentioned, such as the small height of the sides of the table above floor level and the cushioning against shock afforded by the spring mountings. At the same time, the table discharges directly into the skip and may be operated as rapidly as material may be deposited therein and weighed. The air cylinder is supported entirely on the scale frame so that its presence or operation does not affect the scale in any way. The control for the air cylinder may be of any conventional type, and hose connections (not shown) are provided for the cylinder. The construction is simple and sturdy and, since it may be fabricated largely from standard rolled sections, economical withal. The entire assembly rests on the sub-platform 17 of the scale, so that it does not complicate or modify the construction of the scale in any way.

Although I have disclosed herein but a preferred embodiment of my invention, it will be understood that changes in the details and arrangement illustrated may be made without departing from the spirit of the invention or the scope of the appended claims.

I claim:

1. Apparatus for delivering measured amounts of material to a receptacle comprising a frame adapted to be supported on a weighing scale, a table hinged at one end to said frame, the other end being free for tilting upwardly about said one end, a yoke depending from said frame and a fluid-pressure cylinder and piston pivoted to said yoke and said table for lifting said free end to tilt the table and discharge its contents by gravity.

2. Apparatus as defined by claim 1 characterized by a sub-frame, and a plurality of spring cushions on said sub-frame, said table and said first-mentioned frame being supported on said cushions.

3. Apparatus as defined by claim 1 characterized by pairs of adjacent parallel beams pivoted together at one end, the beams of each pair being secured to the table and frame, respectively, forming jack-knife hinges.

4. Apparatus as defined by claim 1 characterized by a sub-frame spring cushions on said sub-frame disposed in rows adjacent the ends of the table, said first-mentioned frame resting on said rows of cushions and including spaced hinge members, and spaced hinge members secured to said table, the adjacent hinge members of the first-mentioned frame and table being pivotally connected at one end.

5. Skip-loading apparatus comprising a table or hopper, a support for said table, said table being tiltable on said support about one end for discharging its contents into the skip, spring cushions supporting said table, a sub-frame supporting said cushions and a fluid-pressure cylinder and piston carried on said support for tilting said table.

6. Apparatus as defined by claim 5 characterized by said support and table having adjacent parallel members secured thereto, respectively, and a pivotal connection between said members at said one end of the table.

7. Apparatus for measuring and delivering material comprising a table disposed at about floor level over a scale pit, a frame supporting the table, a sub-frame below said first-mentioned frame and adapted to rest on a scale placed in said pit, a pivotal connection between one end of the table and the frame, and a fluid-pressure cylinder and piston suspended from the first-mentioned frame for uptilting the table to discharge the contents thereof.

8. Apparatus for receiving material and delivering measured amounts thereof comprising a sub-frame, a weighing scale sub-platform on which the sub-frame is carried, spring cushions carried in said frame, an intermediate frame bearing on said cushions, and a table having a bottom frame resting on the intermediate frame, the bottom frame of the table being hinged at one end to the intermediate frame, and a fluid-pressure cylinder and piston suspended from the intermediate frame for tilting the table.

9. Apparatus as defined by claim 8 characterized by a yoke depending from said intermediate frame in which said cylinder is mounted.

10. Weighing apparatus comprising a table and a supporting frame therefor, spaced pairs of parallel beams below the table, one beam of each pair being fixed to the table and one to the frame, a pivot shaft extending through said beams adjacent one end, a yoke depending from the frame, a fluid-pressure cylinder and piston pivoted at one end to the yoke and at the other to the table, and a supporting structure for said frame adapted to rest on a scale beam.

11. Weighing apparatus comprising a sub-frame adapted to bear on a scale beam, an intermediate frame above said sub-frame, a table hinged to said intermediate frame for tilting movement about one end thereof, a yoke depending from said intermediate frame, and a fluid-pressure cylinder and piston pivoted at one end to the yoke and at the other to the table.

12. Apparatus as defined by claim 11 characterized by spring cushions between said sub-frame and said intermediate frame.

13. Weighing apparatus comprising a table adapted to receive a load and discharge it from one end on tilting thereabout, longitudinal beams below said table spaced across the width thereof, a frame below said table including longitudinal and transverse beams, the longitudinal beams of the frame being disposed adjacent said first-mentioned beams, a pivot shaft extending through the first-mentioned beams and the longitudinal frame beams adjacent said end of the table, a yoke depending from the frame and a fluid-pressure cylinder and piston pivoted at one end to the yoke and at the other to the table, said frame being adapted to rest on a scale beam.

HARRY S. BRADLEY.

REFERENCES CITED

The following references are of record in the file of this patent:

UNITED STATES PATENTS

| Number | Name | Date |
| --- | --- | --- |
| 499,223 | Gorringe | June 13, 1893 |
| 1,207,983 | Newhouse | Dec. 12, 1916 |
| 1,392,075 | Neale | Sept. 27, 1921 |
| 1,965,302 | Wagner | July 3, 1934 |
| 2,450,281 | Hudson | Sept. 28, 1948 |

FOREIGN PATENTS

| Number | Country | Date |
| --- | --- | --- |
| 229,185 | Germany | Dec. 3, 1910 |